United States Patent

Hilhorst et al.

Patent Number: 6,071,548
Date of Patent: *Jun. 6, 2000

[54] WATER CONTINUOUS EDIBLE SPREAD

[75] Inventors: Carolina Maria Hilhorst, Rotterdam; Ronald Albert Schotel, Vlaardingen; Jozephus Johannes Verschuren, Poortugaal, all of Netherlands

[73] Assignee: Van Den Bergh Foods Co., Division of Conopco, Inc., Lisle, Ill.

[ * ] Notice: This patent issued on a continued prosecution application filed under 37 CFR 1.53(d), and is subject to the twenty year patent term provisions of 35 U.S.C. 154(a)(2).

[21] Appl. No.: 08/954,899

[22] Filed: Oct. 21, 1997

Related U.S. Application Data

[63] Continuation of application No. 08/508,409, Jul. 28, 1995, abandoned.

[30] Foreign Application Priority Data

Aug. 1, 1994 [EP]  European Pat. Off. ............. 94202236

[51] Int. Cl.$^7$ ...................................... A23D 7/00
[52] U.S. Cl. .......................... 426/603; 426/602; 426/601; 426/804
[58] Field of Search .................. 426/804, 601, 426/602, 603

[56] References Cited

U.S. PATENT DOCUMENTS

| | | | |
|---|---|---|---|
| 5,169,671 | 12/1992 | Harada | 426/603 |
| 5,294,455 | 3/1994 | O'Brien | 426/603 |
| 5,366,755 | 11/1994 | Timonen | 426/658 |
| 5,366,962 | 11/1994 | Beton | 426/658 |
| 5,422,346 | 6/1995 | Mitchell et al. | |
| 5,468,512 | 11/1995 | Verschuren | 426/585 |
| 5,501,869 | 3/1996 | Buliga | 426/603 |
| 5,624,702 | 4/1997 | Schotel | 426/603 |

FOREIGN PATENT DOCUMENTS

| | | |
|---|---|---|
| 509707 | of 0000 | European Pat. Off. . |
| 605019 | of 0000 | European Pat. Off. . |
| 605020 | of 0000 | European Pat. Off. . |
| 0 470 870 A1 | 8/1991 | European Pat. Off. . |
| 0 532 775 A1 | 9/1991 | European Pat. Off. . |
| 0596 546 A1 | 6/1993 | European Pat. Off. . |
| 0 664 299 A1 | 10/1993 | European Pat. Off. . |
| 0 605 217 A2 | 12/1993 | European Pat. Off. . |
| WO 93/06744 | 10/1992 | WIPO . |

OTHER PUBLICATIONS

International Search Report PCT/EP 95/02979 Jul. 26, 1995.
International Preliminary Examination Report PCT/EP 95/02979 Jul. 26, 1995.
62–61572 JP.
Abstract JP 3280856A.
Abstract JP 3280857.
Abstract JP 4210578.
Abstract JP 4356169.

*Primary Examiner*—Carolyn Paden
*Attorney, Agent, or Firm*—Gerard J. McGowan, Jr.

[57] ABSTRACT

Water continuous edible spread having a solid fat content at 10° C. below 10% and preferably 5%, comprising at least 7 wt % and further preferred at least 9 wt % oligofructose having a weight average degree of polymerisation of at least 14 whereby the short oligofructose molecules are present in very small amounts or not at all, the structuring amount needed thereby being low and the products not showing an undesired off-taste.

5 Claims, No Drawings

WATER CONTINUOUS EDIBLE SPREAD

This is a continuation application of Ser. No. 08/508,409, filed Jul. 28, 1995, now abandoned.

BACKGROUND OF THE INVENTION

The invention relates to a water continuous edible spread suitable for use on bread, toast, having a low fat content and comprising an oligofructose fibrous material. Preferably, the products of the invention have a low saturated fatty acid content and preferably but not exclusively a total fat content of generally below 40% and in particular below 25%. In particular the invention relates to edible spreads products having a solid fats content of less than 5% and in particular of less than 2% measured at 10° C.

Many attempts have been made to formulate low fat and low solid fat spread products. Spreads products having a low fat content and a high water content often take the form of a water-continuous emulsion. In the formulation of these type of spreads the structure can be provided by the presence of macromolecular products, comprising starches and oligofructoses. The use of oligofructose as a structuring agent in spreads has been described before. JP 267450/90 (Ajinimoto Co. Ltd.) discloses the use of polyfructan as a fat or oil substitute in food products. The polyfructans used are prepared made by the use of conidia of Aspergillus sydowi, incubated with sucrose. The molecular weight of the polyfructan used is far higher than those of inulins synthesized by higher plants.

EP 509 707 discloses low fat spreads containing a combination of water soluble starch, alginate and ion source. Spreads according to this document may optionally contain 1 to 15% of a soluble vegetable fibre. An example of a suitable fibre for this purpose mentioned is inulin marketed under the trade name FIBRULINE.

Japanese patent applications 03/280856 and 03/280857 to Ajinomoto Co disclose spreads prepared by solubilizing certain fructan types in hot water or an aqueous solution of food ingredients, followed by cooling under stirring and allowing to stand as to yield a pasty, sometimes butterlike composition.

A problem with the use of the presently known oligofructose materials is that upon their use in spreads, they sometimes give rise to an undesired sweet off-taste, which is in particular present if relatively high levels of oligofructose materials are used. In the case of water-continuous spreads containing low fat and high fibre levels often the desired plasticity is not present, and/or they are too hard and/or they are too thixotropic. Also they sometimes have a tendency to lose water, sometimes the structure is not quite smooth and may show some graininess and also they may have a tendency to lose structure upon shear. It was also discovered that the appearance of spreads with relatively high levels of oligofructose materials is not always optimal. With the presently known oligofructose materials, a substantial amount, i.e. 15% or more, was to be used if inulin was to be the sole source of structuring material in order to obtain a low fat spread with a margarine-like structure and performance. Furthermore, the inulins commercially available are relatively expensive, resulting in a desire for highly effective structuring inulin products of which their use in smaller amounts provide sufficient structuring.

All these drawbacks make the presently known inulins less suitable for commercial application in spreads.

Several proposals have been made in the past for solving these problems. In European patent application no. 605 019, spreads comprising an aqueous phase comprising more than 15 wt % oligofructoses and 0.1–7 wt % of fat are described to reduce the undesired off-taste. In European patent application no. 596.546 (Unilever), spreads comprising 10–50 wt % of an oligofructose and another biopolymer in an amount between 0.05 and 30 wt % are described. Still another proposal was made in EP 605 020 by using mono- and di-sacchariden in addition to inulin to reduce the undesired sweet off-taste.

Oligofructoses of the inulin type are for example marketed under the trade name Raftiline™ and Fibruline™. The commercially available inulins are materials mainly comprising the polymerisation product of the general formula $GF_n$, wherein G is glucose and F is fructose, and an n value between 2 and 60. The weight average degree of polymerisation (the weight average n+1 value) of these products usually is in the range of 2 to 10.

SUMMARY OF THE INVENTION

It is the object of the present invention to formulate low fat spread products having a good flavour, texture and appearance, which do not have a tendency to lose water and which do not show the disadvantages of the prior art products. It is another object of the invention to provide low fat spread products which comprise oligofructoses in a relatively low, but still sufficient amount to provide structure to the spread, and which do not have a sweet taste nor undesired off-taste.

Surprisingly it has been found that these high quality, low fat products can be obtained if specific oligofructose materials are used. These oligofructose materials have not been described up till now.

Accordingly, the present invention provides a water continuous edible spread having a solid fat content at 10° C. below 10% by weight comprising at least 7 wt % oligofructose having an weight average degree of polymerisation (DP) of at least 14, whereby the oligofructose comprises between 0 and 8 wt % and preferably between 0 and 5 wt % of molecules of the formula $GF_{1-4}$, based on the total amount of $GF_{1-60}$ in the inulin present in the spread.

Preferably the oligofructose comprises between 0 and 15 wt % of molecules of the formula $GF_{1-9}$, based on the total amount of $GF_{1-60}$ in the inulin present in the spread. In another preferred embodiment, the oligofructose has a weight average degree of polymerisation (DP) of at least 14, whereby the weight ratio of molecules of the formula $GF_{1-9}$ to molecules of the formula $GF_{10-60}$ is between 1:8–1:30. In a further embodiment, said weight ratio is between 1:12 and 1:25.

The weight percentage of molecules of the formula $GF_{1-4}$ is determined by a standardized method for the determination of glucose, fructose, sucrose, GF2, GF3 and higher GF units. Thereto, samples of these components are solved in a 0.05M NaOH solution, sonicated and filtered. Subsequently the sugars are analyzed with High Performance Anion Exchange Chromatography (HPAEC). After separation on an anion exchange column (Carbopac PA-100, ex Dionex), using a binary gradient of NaOH and NaOH/NaAc, the sugars are detected by Pulsed Amperometric Detection (PAD, ex Antec, model Decade). The weight percentages of the several components are calculated from their concentrations, which are calculated by external calibration. The response factors have been estimated, based on some modelcompounds up to GF13 and supposed to be constant for the higher GF units. Identification of the peaks takes place by their retention times.

The weight average degree of polymerisation of the oligofructose material is preferably 16 to 40, more preferred 16 to 30, most preferred 18 to 25. The oligofructose used will comprise a relatively small amount of molecules having 9 or less fructose units. It was found that these chains do not contribute to the structuring properties of the inulin to the extent larger oligofructose chains do. Hence, it was found that a particular chain length distribution is required to obtain an optimum of structuring properties, taste, appearance and mouthfeel when the oligofructose material is to be applied in spreads. Accordingly, the material should have a weight ratio of $GF_n$ molecules in which n has a value of 1–9 (=$GF_{n=1-9}$ to $GF_{10-60}$ between 1:8–1:30 and preferably between 1:12 and 1:25.

If oligofructoses (or polyfructoses) are applied having a substantial amount of chains in which n is 60 or more, a sandy, thick mouthfeel is obtained when such oligofructose material is applied in spreads. The presence of such molecules is therefore preferably omitted. In a very suitable embodiment of the invention inulin derived from Jerusalem artichoke or chicory is used as a source to obtain the oligofructose material for the present invention from. Such material is than treated to remove any molecules in which n is 9 or less, to such an extent that the ratio of $GF_{|n=1-9|}$ to $GF_{|10-60|}$ is between 1:8 and 1:30.

The water continuous spreads of the present invention contain at least 7% of oligofructose of the present invention. Preferably, such spread comprise at least 9% of inulin. As in water continuous spreads, the structure and plastic properties are mainly derived from the aqueous phase, it is for this type of spreads found to be very surprising that such low amounts of inulin used provide sufficient structuring properties without giving the spread an unpleasant off-taste which has been observed with the water continuous spreads prepared by inulins not fulfilling the conditions indicated in this specification, whereas it is known that for fat-continuous spreads, off-taste can be masked by the fat present in such a spread.

According to this preferred embodiment, there is no need for the presence of an additional structuring agent, although it is to be understood that any such presence is still another embodiment of the invention.

For the purpose of the invention, at least 7 wt % of the inulin is to be present, whereby, depending on the exact type of inulin, this is a structuring amount of oligofructose. With a structuring amount, a level of inulin is meant at which the material is no longer soluble in the system, but is present as discrete particles which may provide structure to the product. The structuring amount of oligofructoses can suitably be determined by any suitable technique, for example by mixing all ingredients other than oligofructoses and then gradually adding oligofructoses while measuring the viscosity. At a certain level of oligofructoses a structure is formed by the oligofructoses. This may be evidenced e.g. by a change in melting temperature or an increase of viscosity. For the purpose of the invention any levels of oligofructoses above the level where a structure begins to form are referred to a structuring amounts. According to a preferred embodiment, less than 25 wt % of the oligofructose material is present, and more preferred less than 20 wt %, further preferred less than 18 wt % of oligofructose material is present in the composition of the present invention.

DETAILED DESCRIPTION OF THE INVENTION

Preferably the particle size of the oligofructose agglomerates in the spread is in the order of magnitude of 0.5–20, preferably 1–15 micrometer which can be effected by suitable processing.

The use of an inulin as claimed in the specification is in particular very useful in water-continuous spreads.

For optimising the flavour of the spreads of the invention it is especially preferred to incorporate a dairy ingredient into the spread. The optimum level of dairy ingredients will be dependent on the type and saccharide or fat level of the dairy product. Also combinations of dairy products may be used.

If whole milk, semi skimmed milk, skimmed milk or combinations thereof are used, the total level thereof is preferably from 40 to 85 wt % of the composition, more preferred 50–80 wt %, most preferred 55–80 wt %.

If yoghurt, quark, cottage cheese, butter fat, cream, cream cheese or fromage frais or a combination thereto is used, the total level is preferably from 2–40 wt %, more preferred 5–30 wt %. Under some circumstances it may be advantageous to use a mixture of milk and these ingredients, for example in weight ratios between 20:1 and 2:1, the total level of yoghurt/quark/cottage cheese/fromage frais/cream/ cream cheese and milk being from 60–85 wt %.

If non-dairy cream is used, the preferred level is from 2 to 40 wt %, more preferred 5 to 30 wt %.

Especially preferred is the combined use of cream (dairy or non-dairy) with butter fat, for example in a weight ratio of 20:1 to 1:1.

The water continuous spreads of the invention can contain any fat level as desired. However, the invention provides in particular a very suitable means for obtaining low fat spreads, more particular for obtaining spreads having a fat level of less than 20%, and suitably less than 7% fat. In a preferred embodiment, the compositions of the invention comprise from 0.1 to 7 wt % of fat, more preferred the level of fat is more than 0.5 wt % and less than 4 wt %, most preferred are fat levels from 1 to 3 wt %.

Throughout this specification the terms oil and fat are used interchangeably. They are meant to include triglycerides of natural or synthetic origin such as soybean oil, sunflower oil, palm oil, fish oil, rapeseed oil, coconut oil, and hydrogenated, fractionated and/or interesterified triglyceride mixtures as well as edible substances that are physically similar to triglycerides such as waxes, e.g. jojoba oil and poly fatty acid esters of mono- or di-saccharides, and that can be used as replacement for or in admixture with triglycerides.

Preferably the fat is present in the form of small fat globules or crystals, having a volume weighted mean diameter of less than 20 µm, more preferred from 0.1 to 5 µm, most preferred from 0.5 to 2 µm. The presence of these small fat particles in low fat spreads of the invention has the distinct advantage of providing an improved appearance to the product.

In addition to the above mentioned ingredients, spreads of the invention may comprise a number of optional ingredients such as flavouring, salt, preservatives, acidifiers, vitamins, colouring materials etc.

Preferably the level of flavouring materials (other than those which are incorporated through any dairy ingredients) is less than 0.5 wt %, for example 0.01 to 2 wt %. Preferably, some salt is present, whereby the level of salt (sodium chloride) will suitably be in the range of 0 to 4 wt %, more preferred 0.1 to 3 wt %, most preferred 0.5 to 1.2 wt %.

Preservatives are preferably incorporated at a level of 0–4 wt %, more preferred 0.01 to 1 wt %, most preferred 0.05 to 25 0.3 wt %. Especially preferred is the use of potassium sorbate. A preferred colouring material is carotene; preferred levels of colouring material are from 0–1 wt %, more preferred 0.01 to 0.2 wt %. Acidifiers may be incorporated to bring the pH of the product to the desired level, preferably the pH of the product is from 3 to 10, more preferred 3.5 to 7. A suitable acidifier is for example tactic acid or citric acid.

Another optional ingredient which may be present in compositions of the invention are proteins. Preferably the protein level in spreads of the invention is from 0.5 to wt %, more preferred, 2 to 6 wt %, most preferred 2.5 to 4%. In an especially preferred embodiment of the invention the protein are partially or wholly obtained from dairy sources. In another preferred embodiment of the invention the protein is wholly or partially a vegetable protein, especially soy bean protein. For example if mixtures of these ingredients are used suitable weight ratios of dairy protein to vegetable protein may for example be from 10:1 to 1:10.

The spread may further containing small particles such as herbs and vegetables. The total level thereof will generally be less than 10 wt %.

Spreads of the invention will generally comprise a substantial amount of water. Suitable amounts are from 50 to 84.9 wt % of the composition, more preferred 55 to 80 wt %, most preferred 60 to 75 wt %. Water may be incorporated as such, or as part of the other ingredients such as milk etc. Spreads of the invention are water-continuous in the sense that they comprise a continuous aqueous phase. Water-continuous spreads can readily be distinguished from fat-continuous spreads by virtue of conductivity measurements.

Spreads of the invention can suitably be used as bread spreads to replace e.g. margarine or halvarine, but they can also suitable be used as flavoured spread, for example cheese spreads, meat spreads, nut spreads, sweet spreads or vegetable spreads.

By the term spreads are meant butter-like compositions which do not tear the bread upon spreading. Such spreads suitably have a stress-strain relation with $\epsilon_{max}$ is 0.01–0.5, $\sigma_{max}$ is 0.3–60 kPa and $\sigma_p/\sigma_{max}$ is 0.2–0.95. More preferably, $\epsilon_{max}$ is 0.05–0.3, $\sigma_{max}$ is 0.8–30 kPa and $\sigma_p/\sigma_{max}$ is 0.3–0.8. A description of the method is found in European Patent Application no. 574 973.

Spreads of the invention may be prepared by any suitable method for the preparation of water-continuous spread products. A preferred method however involves the mixing of the ingredients, optionally followed by pasteurisation and homogenisation, followed by cooling in one or more scraped surface heat exchangers (A-units) to a temperature of 0 to 10° C., optionally followed by processing through one or more C-units. Pasteurisation is especially preferred for extenting the keepability of the product. Homogenisation is preferred for effecting the formation of small fat globules to enhance the appearance of the spread. After preparation the spreads are generally packed in wrappers or containers, generally tubs with a content of 2–1000 g will be used, especially 5, 10, 15, 250 or 500 g. Preferably the packed product is stored at refrigerator temperatures.

The invention will be elucidated in the following examples of some representative embodiments thereof. Parts and percentages are referring to weights, unless otherwise indicated.

The hardness analysis was carried our by use of a a Proton/Wilton SMS TA-XT2 Texture Analyser, whereby a 12.7 mm diameter stainless steel probe was applied. The set up used was as follows

| Pre-test speed | 2.0 mm/s |
|---|---|
| Test speed | 2.0 mm/s |
| Post-test speed | 2.0 mm/s |
| Distance | 10 mm |
| Time | 0.01 s |
| Trigger type | auto |
| Trigger force | 5 g |
| temperature | 5° C. |

EXAMPLE I

Several standard system compositions were prepared in order to compare the structuring properties of the oligofructoses of the present invention with prior art oligofructoses. Thereto, the oligofructose was added to an aqueous solution of pH 4.9, dissolving temperature was 60° C. Dissolving was carried out in an Ultra-turrax. The obtained solution was then fed through a common margarine processing equipment (A-unit, C-unit, A-unit) at common margarine processing conditions chosen to obtain water-continuous mixtures. The following results were obtained after SMS/TPA measurement:

| A | 30% Raftiline LS (DP 12; $GF_{1-4}$ 13.5 wt %) | 150 g/kg |
|---|---|---|
| B | 20% Raftiline LS (DP 12; $GF_{1-4}$ 13.5 wt %) | 20 g/kg |
| C | 20% Fibruline LC (DP 20; $GF_{1-4}$ 13 wt %) | 160 g/kg |
| D | 25% oligofructose (DP 25; $GF_{1-4}$ 1.3 wt %) | 210 g/kg |
| E | 20% oligofructose (DP 25; $GF_{1-4}$ 1.3 wt %) | 160 g/kg |

A: inulin with 50.6 wt % of $GF_{1-9}$ chain length molecules and a weight ratio of $GF_{n=1-9}:GF_{n=10-60}$ of 1:1;

B: inulin with 50.6 wt % of $GF_{1-9}$ chain length molecules and a weight ratio of $GF_{n=1-9}:GF_{n=10-60}$ of 1:1;

C: inulin with 27 wt % of $GF_{1-9}$ chain length molecules and a weight ratio of $GF_{n=1-9}:GF_{n=10-60}$ of 1:2.7;

D: inulin with 6 wt % of $GF_{1-9}$ chain length molecules and a weight ratio of $GF_{n=1-9}:GF_{n=10-60}$ of 1:16;

E: inulin with 6 wt % of $GF_{1-9}$ chain length molecules and a weight ratio of $GF_{n=1-9}:GF_{n=10-60}$ of 1:16.

Raftiline LS™ and Fibruline LC™ (comparative) have a clear, unpleasant, somewhat sweet off-taste, which was not observed for the last two products which are according to the invention. The off-taste is believed to be caused by the, $GF_{n=1-9}$ molecules in the inulins.

EXAMPLE II

Solutions of the inulin material of Example 1E and maltodextrin NS 97–2 (National Starch, U.S.A.) were prepared by heating water to about 60° C. and subsequent addition of the inulin and starch in a Turrax mixer. Amounts used and TPA values measured are indicated in the table.

TABLE

| inulin [%] | NS 97-2 [%] | TPA-SMS [g/kg] |
|---|---|---|
| 15 | 3 | 72 |
| 16 | 3 | 153 |
| 17 | 3 | 180 |
| 18 | 3 | 197 |
| 19 | 3 | 236 |
| 20 | 3 | 296 |

EXAMPLE III

| Comparative | |
|---|---|
| Raftiline LS (as described at Example 1A) | 30% |
| Maltodextrin (NS 97-2) | 5% |
| gelatin (bloom strength 250) | 0.25% |
| dairy cream (40% fat) | 7.5% |
| TPA-SMS value was 230 g/kg | |
| invention | |
| oligofructose (as described at Example 1E) | 18% |
| Maltodextrin (NS 97-2) | 3.3% |
| dairy cream (40% fat) | 7.5% |
| TPA-SMS value was 320 g/kg | |

The product of the invention was plastic, did not show any shear thinning, and had a pleasant mouthfeel with a fast melting pattern and good taste. The comparative product needed a significant larger amount of inulin material and maltodextrin, whereas the hardness was clearly lower than that of the invention product. An unpleasant off-taste was observed.

EXAMPLE IV

Two water continuous compositions were prepared; a comparative composition for which an inulin was used as described for Example 1A, and a composition according to the invention for which inulin as described for Example 1E was used. The following ingredients were used.

| | |
|---|---|
| inulin | 15 wt % |
| dairy cream (40% fat) | 40 wt % |
| sucrose | 5 wt % |
| salt | 0.2 wt % |
| K-sorbate | 0.12 wt % |
| milk | up to 100 wt % |

The comparative composition had a TPA-SMS value of about 20 g/kg, the invention composition had a TPA-SMS of 243 g/kg. A strong taste difference between the two water continuous spreads was observed, whereby that of the product according to the invention was preferred above that of the comparative product.

EXAMPLE V

A sweet spread was prepared from the following ingredients: 18% inulin (containing 10–60 GF units per molecule, weight average DP 25 $GF_{n=1-9}:GF_{n=10-60}$ of 1:16)

5% saccharose
38% dairy cream
0.2% NaCl
0.13% K-sorbate
flavour
up to 100% skimmed milk The spread was prepared by dissolving the inulin in the skimmed milk using a high energy mixer (Ultra turrax) TM for approximately 2 minutes at a temperature of about 60° C. Subsequently the other ingredients were added to the premix. During mixing the pH was adjusted to appr. 5.4 by adding a small amount of lactic acid. The mixture was then processed using a conventional margarine line and filled in tubs which were immediately stored in a refrigerator at 5° C.

After one week of storage the product was tested and showed a similar texture and mouthfeel as the reference product with 35% level of inulin with a DP of about 10. The hardness value (TPA) was tested and found to be about 300 g/kg.

EXAMPLE VI

A sweet banana spread was prepared by the process similar as described in Example V, using the following ingredients:

| | |
|---|---|
| Bananapuree | 40% |
| Oligofructose (DP 25, $GF_{n-1-9}:GF_{n-10-60}$ 1:16) | 17% |
| Dairy cream (40% fat) | 10% |
| P-sorbate | 0.12% |
| Water | 32.88% |
| pH ajusted to 4.9 | |

The TPA-SMS hardness was 250 g/kg, no flavouring masking additives were needed to get a pleasant fruit taste without off-taste.

EXAMPLE VII

A milk-based spread was prepared using the process steps as described for Example V, the ingredients used being:

| | |
|---|---|
| Oligofructose (DP 25, $GF_{n-1-9}:GF_{n-10-60}$ 1:16) | 15% |
| Dairy cream (40% fat) | 20% |
| Sugar | 1% |
| P-sorbate | 0.12% |
| Salt | 0.1% |
| Quark | 20% |
| Milk (full fat) | 43.78% |

The hardness of the product was 150 g/kg, the taste was milky, with a rich and dairy impression. No unpleasant off-taste was determined.

EXAMPLE VIII

A milk-based spread was prepared using the process steps as described for Example V, the ingredients used being:

| | |
|---|---|
| Oligofructose (DP 25, $GF_{n-1-9}:GF_{n-10-60}$ 16) | 16% |
| Dairy cream (40% fat) | 40% |
| Saccharose | 12% |
| P-sorbate | 0.1% |
| Salt | 0.1% |
| Coffee extract (10%) | 31.8 |

EXAMPLES IX–XVI

The process of example V was repeated using the following ingredients. Accordingly, the inulin was dissolved in water of about 60° C., and the procedure described in Example V was followed. The inulin materials used all fulfilled the requirements indicated for the inulins of the present invention. The resulting products all had a hardness value (TPA) in the range of 150 to 500.

EXAMPLE IX

| | |
|---|---|
| Oligofructose DP 14 | 20% |
| Paselli SA-2 | 3.3% |
| Gelatin | 0.17% |
| Dairy cream (40% fat) | 7.5% |
| Salt | 0.4% |
| β-carotene | 0.07% |
| P-sorbate | 0.21% |
| water | to 100% |
| lactic acid to pH 4.8 | |

EXAMPLE X

| | |
|---|---|
| Oligofructose DP 18 | 22% |
| * Paselli SA-2 | 5% |
| Gelatin | 0.25% |
| Dairy cream (40% fat) | 12% |
| Salt, β-carotene, P-sorbate, flavour | to 100% |
| water | |
| lactic acid to pH 4.8 | |

EXAMPLE XI

| | |
|---|---|
| Oligofructose DP 20 | 20% |
| Stellar * | 20% |
| Gelatin | 1% |
| NDC | 12% |
| Salt, β-carotene, P-sorbate, flavour | to 100% |
| water | |
| citric acid to pH 4.8 | |

EXAMPLE XII

| | |
|---|---|
| Oligofructose DP 20–30 | 10% |
| butterfat | 15% |
| maize oil | 20% |
| Na-caseinate | 1% |
| β-carotene | 0.07% |
| Bolec ZTD * | 0.2% |
| salt, P-sorbate, flavour | to 100% |
| water | |
| lactic acid to pH 4.7 | |

EXAMPLE XIII

| | |
|---|---|
| Oligofructose DP >18 | 14% |
| butterfat | 20% |
| Na-caseinate | 1% |
| Bolec ZTD * | 0.2% |
| β-carotene, salt, P-sorbate, flavour | to 100% |
| water | |
| lactic acid to pH 4.8 | |

EXAMPLE XIV

| | |
|---|---|
| Oligofructose DP >14 | 15% |
| Sunflower oil | 40% |
| Na-caseinate | 1% |
| Bolec ZTD * | 0.2% |
| Salt, β-carotene, P-sorbate, flavour | to 100% |
| water | |
| lactic acid to pH 4.8 | |

EXAMPLE XV

| | |
|---|---|
| Oligofructose DP 25–30 | 13% |
| sunflower oil | 70% |
| Na-caseinate | 1% |
| Bolec ZTD * | 0.2% |
| salt, β-carotene, P-sorbate, flavour | to 100% |
| water | |
| lactic acid to pH 4.8 | |

EXAMPLE XVI

| | |
|---|---|
| Oligofructose DP 25–30 | 20% |
| sunflower oil | 1% |
| gelatin | 1.5% |
| salt, β-carotene, P-sorbate, flavour | to 100% |
| water | |
| lactic acid to pH 4.8 | |

* Ingredients identified by a trade name
Paselli SA-2: potato starch derivative ex Avebe
Stellar: modified starch ex Amylum
Bolec ZTD: lecithin ex Quest
NDC: Non dairy cream

What is claimed is:

1. A water continuous edible spread having a solid fat content at 10° C. below 10% by weight, comprising at least 7 wt. % oligofructose, the oligofructose having a weight average degree of polymerization (DP) of a least 14, whereby the oligofructose comprises between 0 and 8 wt. % of molecules of the formula $GF_{1-4}$, based on the total amount of $GF_{1-60}$ in the oligofructose present in the spread, and a weight ratio of molecules of the formula $GF_{1-9}$ to molecules of the formula $GF_{10-60}$ of between 1:8–1:30, the spreads not having a sandy, thick mouthfeel.

2. Spread according to claim 1, wherein the oligofructose has a weight ratio of molecules of the formula $GF_{1-9}$ to molecules of the formula $GF_{10-60}$ is between 1:12 and 1:25.

3. Spread according to claim 1, wherein the oligofructose has an weight average degree between 16 and 30.

4. Spread according to claim 1, wherein the solid fat content at 10° C. is below 5% by weight and preferably below 2% by weight.

5. A water continuous edible spread having a solid fat content at 10° C. below 10% by weight, comprising at least 7 wt. % oligofructose, the oligofructose having a weight average degree of polymerization (DP) of at least 14, whereby the oligofructose comprises between 0 and 8 wt. % of molecules of the formula $GF_{1-4}$, based on the total amount of $GF_{1-60}$ in the oligofructose present in the spread, and a weight ratio of molecules of the formula $GF_{1-9}$ to molecules of the formula $GF_{10-60}$ of between 1:8–1:30.

* * * * *